(12) United States Patent
Pai et al.

(10) Patent No.: US 8,738,190 B2
(45) Date of Patent: May 27, 2014

(54) INDUSTRIAL CONTROL ENERGY OBJECT

(75) Inventors: Ramdas M. Pai, Racine, WI (US); David D. Brandt, New Berlin, WI (US); Richard Arthur Morgan, Milwaukee, WI (US); David W. Siegler, New Berlin, WI (US); Angel Sustaeta, Austin, TX (US); David A. Vasko, Solon, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 815 days.

(21) Appl. No.: 12/684,469

(22) Filed: Jan. 8, 2010

(65) Prior Publication Data

US 2011/0172838 A1    Jul. 14, 2011

(51) Int. Cl.
*G05D 3/12* (2006.01)

(52) U.S. Cl.
USPC .......................................................... 700/286

(58) Field of Classification Search
USPC .......................................................... 700/286
See application file for complete search history.

(56) References Cited

U.S. PATENT DOCUMENTS

| | | | | |
|---|---|---|---|---|
| 4,039,392 A | * | 8/1977 | Singh | 202/93 |
| 4,300,125 A | * | 11/1981 | Loshing et al. | 340/870.02 |
| 4,341,345 A | * | 7/1982 | Hammer et al. | 236/46 R |
| 4,383,298 A | * | 5/1983 | Huff et al. | 705/28 |
| 4,624,685 A | * | 11/1986 | Lueckenotte et al. | 95/3 |
| 4,827,395 A | * | 5/1989 | Anders et al. | 700/9 |
| 5,043,929 A | * | 8/1991 | Kramer et al. | 703/1 |
| 5,202,996 A | * | 4/1993 | Sugino et al. | 717/107 |
| 5,251,205 A | * | 10/1993 | Callon et al. | 370/392 |
| 5,297,057 A | * | 3/1994 | Kramer et al. | 703/7 |
| 5,646,862 A | * | 7/1997 | Jolliffe et al. | 703/1 |
| 5,736,983 A | * | 4/1998 | Nakajima et al. | 715/762 |
| 5,822,207 A | * | 10/1998 | Hazama et al. | 700/97 |
| 5,924,486 A | | 7/1999 | Ehlers et al. | |
| 5,983,622 A | * | 11/1999 | Newburry et al. | 60/775 |

(Continued)

FOREIGN PATENT DOCUMENTS

| | | |
|---|---|---|
| EP | 0977137 A2 | 2/2000 |
| WO | WO 2004/074954 A2 | 2/2004 |
| WO | WO 2008/011427 A2 | 1/2008 |

OTHER PUBLICATIONS

Abb, "Energy Management and Optimization for the Process Industries—Advanced IT Tools for Planning, Monitoring, Controlling, and Reporting Energy System Operations", Aug. 11, 2006 Brochure, published online at [http://library.abb.com/global/scot/scot296.nsf/veritydisplay/ bd2a898a24267c46c12571c70070a851/$File/3BFI402000R3001_en_Advanced_IT_Tools_for_Energy_Management.pdf], retrieved Apr. 13, 2009, 6 pages.

(Continued)

*Primary Examiner* — Kavita Padmanabhan
*Assistant Examiner* — Thomas Stevens
(74) *Attorney, Agent, or Firm* — Fletcher Yoder, P.C.; William R. Walbrun; John M. Miller

(57) ABSTRACT

An energy object extension to an industrial protocol having a comprehensive suite of attributes, messages and services utilized for the monitoring and control of energy consuming or producing resources by a manufacturing automation application is provided. The energy object includes an identifier associated with an energy resource that is associated with a manufacturing automation application and an energy type associated with the energy resource. This includes a measurement characteristic associated with the energy resource to facilitate energy management by the manufacturing automation application.

52 Claims, 11 Drawing Sheets

(56) References Cited

U.S. PATENT DOCUMENTS

| | | | |
|---|---|---|---|
| 6,012,053 A | 1/2000 | Pant et al. | |
| 6,015,783 A * | 1/2000 | von der Osten et al. | 510/392 |
| 6,076,108 A * | 6/2000 | Courts et al. | 709/227 |
| 6,263,255 B1 * | 7/2001 | Tan et al. | 700/121 |
| 6,281,784 B1 * | 8/2001 | Redgate et al. | 340/12.33 |
| 6,289,252 B1 * | 9/2001 | Wilson et al. | 700/7 |
| 6,321,983 B1 | 11/2001 | Katayanagi et al. | |
| 6,473,893 B1 * | 10/2002 | Kay et al. | 717/116 |
| 6,507,774 B1 * | 1/2003 | Reifman et al. | 700/274 |
| 6,633,823 B2 | 10/2003 | Bartone et al. | |
| 6,701,298 B1 | 3/2004 | Jutsen | |
| 6,747,368 B2 * | 6/2004 | Jarrett, Jr. | 307/31 |
| 6,785,592 B1 | 8/2004 | Smith et al. | |
| 6,857,020 B1 | 2/2005 | Chaar et al. | |
| 7,043,316 B2 | 5/2006 | Farchmin et al. | |
| 7,277,864 B2 | 10/2007 | Ohnemus et al. | |
| 7,409,303 B2 * | 8/2008 | Yeo et al. | 702/60 |
| 7,451,019 B2 * | 11/2008 | Rodgers | 700/295 |
| 7,477,956 B2 * | 1/2009 | Huang et al. | 700/100 |
| 7,565,351 B1 * | 7/2009 | Callaghan | 1/1 |
| 7,587,251 B2 | 9/2009 | Hopsecger | |
| 7,788,189 B2 * | 8/2010 | Budike, Jr. | 705/400 |
| 8,271,363 B2 * | 9/2012 | Branscomb | 705/34 |
| 2001/0011368 A1 * | 8/2001 | Graser et al. | 717/3 |
| 2002/0013744 A1 | 1/2002 | Tsunenari et al. | |
| 2002/0026343 A1 | 2/2002 | Duenke | |
| 2002/0066072 A1 | 5/2002 | Crevatin | |
| 2002/0099464 A1 * | 7/2002 | O'Connor et al. | 700/117 |
| 2002/0099804 A1 * | 7/2002 | O'Connor et al. | 709/220 |
| 2002/0116239 A1 | 8/2002 | Reinsma et al. | |
| 2002/0128933 A1 * | 9/2002 | Day et al. | 705/27 |
| 2002/0168621 A1 * | 11/2002 | Cook et al. | 434/350 |
| 2002/0169582 A1 * | 11/2002 | Eryurek et al. | 702/183 |
| 2002/0178047 A1 | 11/2002 | Or et al. | |
| 2002/0198755 A1 | 12/2002 | Birkner et al. | |
| 2003/0014500 A1 | 1/2003 | Schleiss et al. | |
| 2003/0028527 A1 | 2/2003 | Crosby et al. | |
| 2003/0042794 A1 * | 3/2003 | Jarrett, Jr. | 307/23 |
| 2003/0061091 A1 | 3/2003 | Amaratunga et al. | |
| 2003/0088370 A1 * | 5/2003 | Bagepalli et al. | 702/32 |
| 2003/0110065 A1 | 6/2003 | Twigge-Molecey | |
| 2003/0110369 A1 * | 6/2003 | Fish et al. | 713/1 |
| 2003/0171851 A1 | 9/2003 | Brickfield et al. | |
| 2003/0221119 A1 * | 11/2003 | Geiger et al. | 713/200 |
| 2004/0028966 A1 * | 2/2004 | Hibbs et al. | 429/21 |
| 2004/0088119 A1 * | 5/2004 | Landgraf | 702/33 |
| 2004/0107345 A1 * | 6/2004 | Brandt et al. | 713/171 |
| 2004/0117240 A1 | 6/2004 | Ness et al. | |
| 2004/0143467 A1 * | 7/2004 | McAllister et al. | 705/7 |
| 2004/0158506 A1 | 8/2004 | Wille | |
| 2004/0199294 A1 * | 10/2004 | Fairlie et al. | 700/266 |
| 2004/0205412 A1 * | 10/2004 | Staron et al. | 714/38 |
| 2004/0225649 A1 * | 11/2004 | Yeo et al. | 707/3 |
| 2004/0249697 A1 | 12/2004 | Ohnemus et al. | |
| 2004/0260489 A1 | 12/2004 | Mansingh et al. | |
| 2004/0261673 A1 * | 12/2004 | Allen et al. | 110/342 |
| 2005/0015287 A1 | 1/2005 | Beaver | |
| 2005/0034023 A1 * | 2/2005 | Maturana et al. | 714/37 |
| 2005/0065971 A1 | 3/2005 | Honda | |
| 2005/0143865 A1 | 6/2005 | Gardner | |
| 2005/0144154 A1 | 6/2005 | DeMesa et al. | |
| 2005/0171910 A1 | 8/2005 | Wu et al. | |
| 2005/0198241 A1 * | 9/2005 | Pavlik et al. | 709/223 |
| 2005/0198333 A1 | 9/2005 | Dinges et al. | |
| 2005/0278296 A1 | 12/2005 | Bostwick | |
| 2006/0026145 A1 | 2/2006 | Beringer et al. | |
| 2006/0248002 A1 | 11/2006 | Summer et al. | |
| 2006/0276938 A1 * | 12/2006 | Miller | 700/295 |
| 2007/0038646 A1 | 2/2007 | Thota | |
| 2007/0073750 A1 * | 3/2007 | Chand et al. | 707/101 |
| 2007/0078736 A1 | 4/2007 | Chand et al. | |
| 2007/0168213 A1 * | 7/2007 | Comrie | 705/1 |
| 2007/0226068 A1 | 9/2007 | Keil et al. | 705/26 |
| 2007/0283030 A1 * | 12/2007 | Deininger et al. | 709/230 |
| 2008/0015975 A1 * | 1/2008 | Ivchenko et al. | 705/37 |
| 2008/0046387 A1 * | 2/2008 | Gopal et al. | 705/412 |
| 2008/0046407 A1 | 2/2008 | Shah et al. | |
| 2008/0059457 A1 | 3/2008 | Ohnemus et al. | |
| 2008/0079560 A1 * | 4/2008 | Hall et al. | 340/506 |
| 2008/0127779 A1 | 6/2008 | Morales Cerda et al. | |
| 2008/0154749 A1 | 6/2008 | D'hooghe et al. | |
| 2008/0255899 A1 | 10/2008 | McConnell et al. | |
| 2008/0270272 A1 * | 10/2008 | Branscomb | 705/30 |
| 2008/0272934 A1 * | 11/2008 | Wang et al. | 340/870.11 |
| 2008/0319812 A1 | 12/2008 | Sousa et al. | |
| 2009/0083843 A1 * | 3/2009 | Wilkinson et al. | 726/9 |
| 2009/0099887 A1 | 4/2009 | Sklar et al. | |
| 2009/0100159 A1 * | 4/2009 | Extra | 709/221 |
| 2009/0132176 A1 | 5/2009 | McConnell et al. | |
| 2009/0138415 A1 * | 5/2009 | Lancaster | 706/11 |
| 2009/0177505 A1 | 7/2009 | Dietrich et al. | |
| 2009/0222307 A1 | 9/2009 | Beaver | |
| 2009/0281674 A1 * | 11/2009 | Taft | 700/286 |
| 2009/0281677 A1 * | 11/2009 | Botich et al. | 700/295 |
| 2009/0313164 A1 * | 12/2009 | Hoglund | 705/39 |
| 2009/0319315 A1 * | 12/2009 | Branscomb | 705/7 |
| 2010/0023360 A1 | 1/2010 | Nadhan | |
| 2010/0030601 A1 | 2/2010 | Warther et al. | |
| 2010/0042455 A1 | 2/2010 | Liu et al. | |
| 2010/0057480 A1 * | 3/2010 | Arfin et al. | 705/1 |
| 2010/0088136 A1 | 4/2010 | Cheng et al. | |
| 2010/0100405 A1 | 4/2010 | Lepore et al. | |
| 2010/0131343 A1 * | 5/2010 | Hamilton et al. | 705/14.23 |
| 2010/0138003 A1 * | 6/2010 | August et al. | 700/22 |
| 2010/0217642 A1 * | 8/2010 | Crubtree et al. | 705/8 |
| 2010/0217651 A1 * | 8/2010 | Crabtree et al. | 705/10 |
| 2010/0218108 A1 * | 8/2010 | Crabtree et al. | 715/738 |
| 2010/0249975 A1 | 9/2010 | Rezayat | |
| 2010/0262445 A1 | 10/2010 | DeSorbo | |
| 2010/0274367 A1 | 10/2010 | Kaufman et al. | |
| 2010/0274377 A1 * | 10/2010 | Kaufman et al. | 700/103 |
| 2010/0274602 A1 * | 10/2010 | Kaufman et al. | 705/7 |
| 2010/0274603 A1 | 10/2010 | Walker et al. | |
| 2010/0274611 A1 | 10/2010 | Kaufman et al. | |
| 2010/0274612 A1 * | 10/2010 | Walker et al. | 705/8 |
| 2010/0274629 A1 | 10/2010 | Walker et al. | |
| 2010/0274810 A1 | 10/2010 | Walker et al. | |
| 2010/0275147 A1 | 10/2010 | Kaufman et al. | |
| 2010/0292856 A1 * | 11/2010 | Fujita | 700/291 |
| 2010/0314940 A1 * | 12/2010 | Palmer et al. | 307/39 |
| 2010/0318233 A1 * | 12/2010 | Yunes et al. | 700/287 |
| 2010/0332373 A1 * | 12/2010 | Crabtree et al. | 705/37 |
| 2011/0046800 A1 * | 2/2011 | Imes et al. | 700/286 |
| 2011/0071721 A1 * | 3/2011 | Gilfillan et al. | 701/30 |
| 2011/0273022 A1 * | 11/2011 | Dennis et al. | 307/72 |
| 2012/0174830 A1 * | 7/2012 | Comrie | 106/709 |

OTHER PUBLICATIONS

Abb, "Energy Management Solution for the Process Industry—Energy Management and Optimization", Apr. 6, 2007 Brochure, published online at [http://library.abb.com/global/scot/scot313. nsf/veritydisplay/5e48efb88a7e1cbac125734600737b02/$File/3BFI405000R4001_en_Energy_Management_and_Optimization_3.5.pdf], retrieved Apr. 13, 2009, 12 pages.

Dietmair, A., et al., "Energy Consumption and Optimization for Production Machines", Sustain-able Energy Technologies, 2008, ICSET 2008, IEEE International Conference on IEEE, Piscataway, NJ, USA, Nov. 24, 2008, pp. 574-579, XP031442235, ISBN:978-1-4244-1887-9.

EPO: Notice from the European Patent Office dated Oct. 1, 2007 concerning Business Methods, Official Journal of the European Patent Office, vol. 30, No. 11, Nov. 1, 2007, pp. 592-593.

European Search Report for European Patent Application No. 10160581.4-1238 dated Sep. 23, 2010, 8 pages.

European Search Report for European Patent Application No. 10160585.5-1527/2254061 dated Dec. 20, 2010, 9 pages.

European Search Report for European Patent Application No. 10160649.9-1238 dated Sep. 23, 2010, 8 pages.

European Search Report for European Patent Application No. 10160673.9-1238 dated Sep. 23, 2010, 9 pages.

(56) References Cited

OTHER PUBLICATIONS

European Search Report for European Patent Application No. 10160737.2.-1238 dated Nov. 4, 2010, 9 pages.
European Search Report for European Patent Application No. 10160810 dated Aug. 6, 2010, 2 pages.
European Search Report for European Patent Application No. 10160811.5 dated Sep. 20, 2010, 9 pages.
GE Energy, "Energy and Asset Performance—Fact Sheet", Sep. 2005, General Electric Company, published online at [http://www.gepower.com/prod_serv/serv/industrial_service/en/downloads/gea14163_eap.pdf], retrieved Apr. 13, 2009, 2 pages.
Kennedy, Pat, et al., "In Pursuit of the Perfect Plant—A Business and Technical Guide", Apr. 2008, Chapter 9—Energy Management, pp. 251-283; published by Evolved Technologist Press, New York, New York, USA.
Kiritsis D., et al., "Research Issues on Product Lifecycle Management and Information Tracking Using Smart Embedded Systems", Advanced Engineering Informatics, Elsevier Lnkd—DOI : 10.1016/J. AEI.2004.09.005, vol. 17, No. 3-4, Jul. 1, 2003, pp. 189-202, XP004595481 ISSN: 1474-0346.
Kouloura, et al., "A Systems Approach to Corporate Sustainability in Energy Management of Industrial Units", IEEE Systems Journal, vol. 2, No. 4, Dec. 2008, pp. 442-452.
Seref Erkayhan Ed—Ding Zhen-Hua, et al., "The Use of RFID Enables a Holistic Information Management Within Product Lifcycle Management (PLM)". RFID Eurasia, 2007 1$^{st}$ Annual, IEEE, PI Sep. 1, 2007, pp. 1-4 XP031153342. ISBN: 978-975-01-5660-1.
Yang, et al., "Eco-Design for Product Lifecycle Sustainability", IEEE International Conference on Industrial Informatics, 2006, pp. 548-553.
Y-S Ma, et al., "Product Lifecycle Analysis and Optimization in an Eco-Value Based, Sustainable and Unified Approach", Industrial Informatics, 2006 IEEE International Conference on, IEEE, PI, Aug. 1, 2006, pp. 537-541, XP031003409, ISBN:978-0-7803-9700-2.
U.S. Appl. No. 13/275,983, filed Oct. 18, 2011, David D. Brandt.
Jawahir, I. S., et al. "Total life-cycle considerations in product design for sustainability: A framework for coomprehensive evaluation." Proc. 10th Int. Research/Expert Conf. (TMT 2006), Barcelona, Spain, 2006.
A.D. Jayal, F. Badurdeen, O.W. Dillon Jr., I.S. Jawahir, Sustainable manufacturing: Modeling and optimization challenges at the product, process and system levels, CIRP Journal of Manufacturing Science and Technology, vol. 2, Issue 3, 2010, pp. 144-152, ISSN 1755-5817.
Dillenburg, Stephen, Timothy Greene, and O. Homer Erekson. "Aproaching socially responsible investment with a comprehensive ratings scheme: total social impact." Journal of Business Ethics 43.3 (2003): 167-177.

* cited by examiner

- Identifier — 310
  - Related automation device or process
- Aggregation — 314
  - Paths to aggregated CIP objects
    - Sub-metering or ability to go to lower energy states (sequential turn-off)
- Role — 320
  - Producer, consumer, both
- Operational State — 324
- Units/scaling — 330
  - Accuracy
- Roll over for Energy — 334
- Production capacity — 340
  - Continuous
  - Stored
  - load size (i.e., W,VAR : electricity)
- Measurements — 344
  - Instantaneous
  - Over a period
  - Negative values are producing
- Type — 350
  - Water, Gas, Air, Steam
  - Energy Quality
- Time reference — 354
  - Time and date of the object (r/w attribute)
- Data log — 360
- Priority — 364
  - Opt-out, critical, non-critical (Grid categories)
  - Load shedding (Load-related)
- Shed and Produce Services — 370
  - Request operation state change estimation
  - Response indicates time to change operational state
  - Actual request to change state
- CIP A&E — 374
  - Alarm on production below measured level (average or instantaneous)
  - Alarm on consumption above measured level

EXAMPLE CIP ENERGY OBJECT ATTRIBUTES & SERVICES

Fig. 3

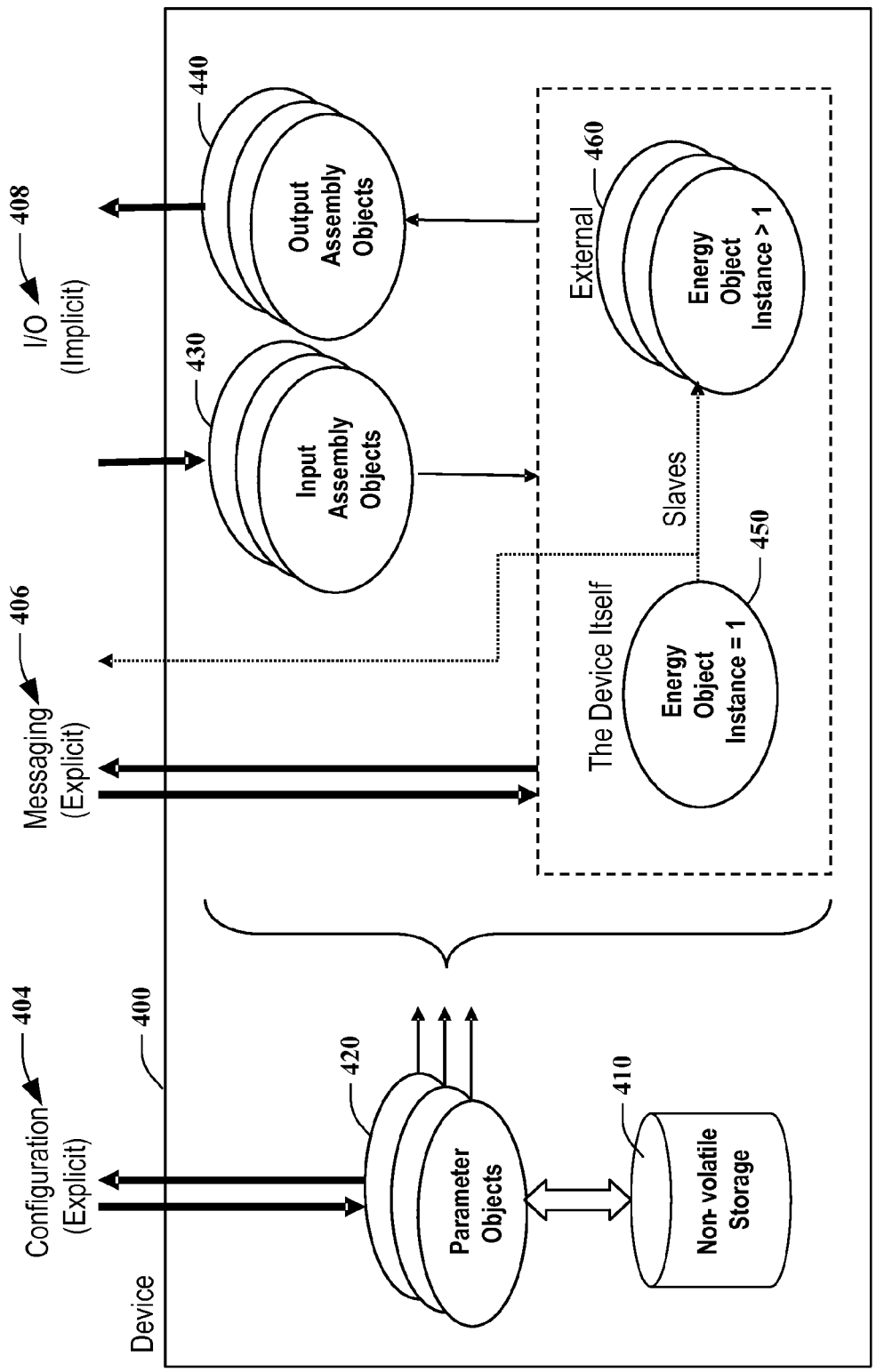

INDUSTRIAL CONTROL ENERGY OBJECT

TECHNICAL FIELD

The claimed subject matter relates generally to industrial control systems and more particularly to control of power and energy that enables efficient and automated management of the same across various communications networks.

BACKGROUND

Various industrial protocols are employed to support automated manufacturing operations and communications. These can include device protocols, mid-level protocols between the device level and the control level, and upper-level protocols such as Ethernet that has been adapted to communicate via industrial control objects among factories and on to high-level networks such as the Internet. In one specific example of such an industrial protocol, the Common Industrial Protocol (CIP™) encompasses a comprehensive suite of attributes, messages and services, organized as objects, for the enablement of manufacturing automation application objectives—control, safety, synchronization, motion, configuration and information collection. Further, it enables users to integrate these manufacturing applications with enterprise-level Ethernet networks and the Internet. Supported by hundreds of vendors around the world, CIP provides users with a unified communication architecture throughout the manufacturing enterprise. The CIP protocol allows users to benefit today from the many advantages of open networks while protecting their existing automation investments when upgrading in the future.

Through the addition of functionally specialized objects, the CIP protocol provides a coherent integration of control, motion and synchronization, configuration and diagnostics, and safety information. This protocol includes seamless bridging and routing without the added cost and complexity of bridges and proxies. Further, the protocol provides freedom to deploy interoperable, multivendor systems, allowing users to choose best-of-breed products, with the assurance of competitive prices and low integration cost. This includes single, media independent protocol for all network adaptations of CIP—EtherNet/IP™, DeviceNet™ CompoNet™, and ControlNet™—that allows users to select the best network or networks for their application while still minimizing their overall investment in system engineering, installation, integration and commissioning. The CIP protocol also integrates support of Modbus® server devices into the CIP architectures with Modbus translation services for originator devices on CIP; allows devices supporting Modbus TCP and EtherNet/IP to reside on the same TCP/IP network—or even in the same device. Modbus integration is accomplished by the usage of objects to create an abstraction. Modbus is then accessed as if the Modbus devices were native CIP devices. It should be recognized that the functionality provided by a CIP object can be extended into other non-CIP networks in a similar manner.

A key topic that has gained prominence in modern industrial manufacturing is the ability to efficiently manage power and energy within a plant or across a set of plants and an associated supply chain, where such management spans a wide geography and communicates over networks. This includes the ability to understand and track in real time, where energy is being generated, transmitted, distributed and utilized. For instance, Cap and Trade policies may have to be considered in the management of a particular plant or even across broader energy domains that may be associated with a grid. Some of the energy management must be coordinated with the grid such as the ability to receive energy from the grid or conversely return unused energy back to the grid for appropriate credit. Unfortunately, existing industrial protocols do not support a standardized ability to aggregate energy data or manage energy resources let alone communicate or facilitate control in even the most basic energy demand applications. Presently, the difficulty in automation due to the lack of uniform methods of energy management information exchange leads most often to a manual exercise that is far from an efficient and responsive method for controlling and managing complex energy flows that dynamically change over time.

SUMMARY

The following summary presents a simplified overview to provide a basic understanding of certain aspects described herein. This summary is not an extensive overview nor is it intended to identify critical elements or delineate the scope of the aspects described herein. The sole purpose of this summary is to present some features in a simplified form as a prelude to a more detailed description presented later.

An energy object is provided that enables energy in all its forms to be managed automatically across industrial communication networks. The energy object includes the ability to aggregate energy data from various point sources that may originate within a plant or more broadly across networks external to the plant that define an energy domain. This can include control devices that report energy that has been discretely taken from or added to a grid such as a smart grid that credits users for efficient energy use and transfer with the respective grid. By automatically collating energy data within an industrial protocol via the energy object and discrete energy monitoring sources, energy can be efficiently managed by associating its use to the actual production of products or services that consume the energy or conversely produce it. By having discrete control and understanding of energy in its smallest or discrete form from numerous network locations, energy can be controlled dynamically as a commodity to best serve various applications. Obvious applications include energy conservation where non-necessary components are idled or previously used processes are employed to return unused energy to an external or internal grid. More complex applications such as Cap & Trade and automated demand response (ADR) can easily employ energy objects as a control mechanism (e.g., turn off or on an energy source) or as a collection mechanism to determine and demonstrate that the energy users are in compliance.

In one aspect, the energy object can include an identifier having a device name, a qualified hierarchy, and an object class for associating a process with an energy source. The object can specify the type of energy consumed such as water, air, gas, electricity and steam (WAGES), for example. This can include measurements, some type of aggregation, and some type of time reference among other parameters. Water, for example, can be used to move materials and provide heating and cooling. Also, considering provision by utilities and climate and geography related usage limitations, it should be apparent that it is reasonable to manage water in an analogous manner as electricity. In another aspect, an energy object extension to an industrial protocol having a comprehensive suite of attributes, messages and services utilized for the monitoring and control of energy consuming or producing resources by a manufacturing automation application is provided. The energy object includes an identifier associated with an energy resource that is associated with a manufacturing automation application and an energy type associated with the energy resource. This includes a measurement characteristic associated with the energy resource to facilitate energy management by the manufacturing automation application.

To the accomplishment of the foregoing and related ends, the following description and annexed drawings set forth in detail certain illustrative aspects. These aspects are indicative of but a few of the various ways in which the principles described herein may be employed. Other advantages and novel features may become apparent from the following detailed description when considered in conjunction with the drawings.

BRIEF DESCRIPTION OF THE DRAWINGS

FIG. 3 is an example set of parameters that can be employed with an energy object FIG. 4 is an example device model that illustrates energy object usage at the device level.

DETAILED DESCRIPTION

An energy object extension to an industrial protocol having a comprehensive suite of attributes, messages and services utilized for the monitoring and control of energy consuming or producing resources by a manufacturing automation application is provided. The energy object includes an identifier associated with an energy resource that is associated with a manufacturing automation application and an energy type associated with the energy resource. This includes a measurement characteristic associated with the energy resource to facilitate energy management by the manufacturing automation application.

Figure 1:
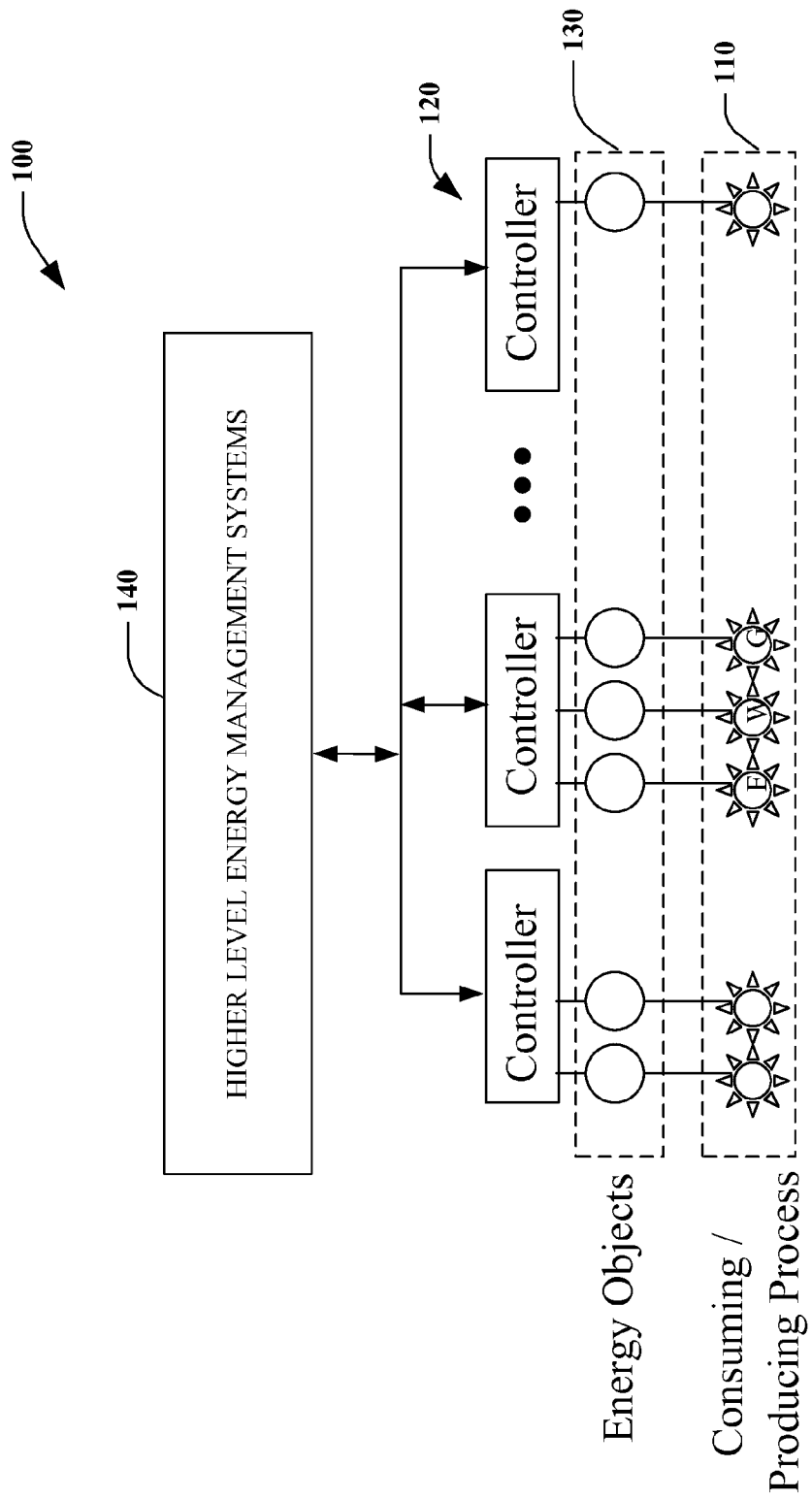
FIG. 1 is a schematic block diagram illustrating industrial energy objects for controlling energy processes.

Referring initially to FIG. 1, a system 100 illustrates industrial energy objects for controlling energy processes an industrial automation environment. The system 100 includes a plurality of consuming or producing energy sources 110 (also referred to as energy resources) that are monitored by various controllers 120, where such controllers 120 can include components or modules that report to supervisory controllers or computer-based applications. For example, a historian component (not shown) may be employed in conjunction with the controller 120 to tag or identify energy measurements associated with a location in an automated process that is associated with the energy sources 110. The controllers 120 create or use one or more energy objects 130 that provide protocol extensions to industrial automation protocols to enhance energy management capabilities of automation devices and software. Substantially any communication protocol can convey energy monitoring and control messages, where such enhancements are described in more detail with respect to FIG. 3. For example, an Ethernet protocol can be enhanced to transport messages from energy objects 130 which in turn can be employed to monitor energy consumption and/or control energy usage.

A basic communication protocol may be extended by layering an industrial communication protocol on top of the basic communication protocol. For example, Ethernet is extended for industrial control purposes by layering the Common Industrial Protocol (CIP) on top of the Internet Protocol (IP) and this on top of Ethernet. Thus, CIP provides a method to interact with the energy object that is independent of the underlying communication protocols. As shown, higher level energy management systems and software 140 can employ the CIP protocol to interact with the energy objects 130 in order to facilitate overall energy control/management of a factory or participate across a network and associated grid with a collection of factories or processes. It should be appreciated that energy objects 130 may reside in controller 120 or more commonly in separate intelligent field devices linked to the controller. The CIP protocol provides transparent access in either case.

In general, the energy objects 130 enable energy in all its forms to be managed automatically across industrial communication networks. The energy object 130 includes the ability to aggregate energy data from various point sources 110 that may originate within a plant or more broadly across networks external to the plant that define an energy domain. This can include control devices 120 that report energy that has been discretely taken from or added to a grid such as a smart grid (not shown) that credits users for efficient energy use and transfer with the respective grid. By automatically collating energy data within an industrial protocol via the energy object 130 and discrete energy monitoring sources 120, energy can be efficiently managed by associating its use to the actual production products or services that consume the energy or conversely produce it. By having discrete control and understanding of energy in its smallest or discrete form from numerous distributed network locations, energy can be controlled dynamically as a commodity to best serve various applications. Obvious applications include energy conservation where non-necessary components are idled or previously used processes are employed to return unused energy to the grid. More complex applications such as Cap & Trade can easily be controlled and monitored via the energy objects 130 that can also be employed as a control mechanism (e.g., turn off or on an energy source) or employed as a reporting device to show companies are in compliance.

In one aspect, the energy object 130 can include an identifier having a device name, a qualified hierarchy, and an object class for associating a process with an energy source. The energy object 130 can specify the type of energy consumed such as water, air, gas, electricity and steam, for example. This can include measurements, some type of aggregation, and some type of time reference among other parameters. In one aspect, an energy object extension to an industrial protocol is provided having a comprehensive suite of attributes, messages and services for the collection of manufacturing automation applications. The energy object 130 includes an identifier associated with an energy consuming or producing resource in a manufacturing automation application and an energy type associated with the energy resource. This energy object also includes a measurement characteristic associated with the energy type among other parameters described below with respect to FIG. 3 for controlling and monitoring the energy resource.

The energy objects 130 enable various aspects of control and monitoring. In one aspect, automated demand response (ADR) programs can be enabled. This allows consumers to automatically reduce usage to reduce peak grid load at utility request or at specific times while addressing energy generation limits, transmission limits, and failures. Demand/response can include reducing the base load, sequencing startup, and shedding non-critical loads. This also includes generating power, storing energy for later usage, staggering power peaks, and operating at a reduced rate/capacity, for example.

The energy objects can be employed in conjunction with a Smart Grid to request/demand to reduce or produce energy, bid exchange for reducing or producing energy, control immediate needs or future consumption (e.g., day ahead event scheduling), or utility measurement enforcement and settlement. Within the confines of the plant, automated measurements determine usage which can be employed to reduce lower production rates, re-schedule production, or shed loads, for example. Energy production can include re-use for the factory, supplying energy to the grid, and receiving credits for excess power supplied to the grid.

Energy can be controlled via the energy objects 130 within the constraints of existing safety control systems. Events should be a request at the machine/cell, not a direct load control. Immediate shutdown of a load, without the proper prerequisite steps, may not be safe. Current event triggered load shedding may be able to occur with a delay to allow safe state controls. Future event load shedding can be scheduled to accommodate safety time. It is also noted that energy can be managed, controlled, and computed in substantially any form. This includes measurements that relate to energy (e.g., joules), voltage, current (real and reactive), power (e.g., joules/sec, volt*amps), fluid flows, pressure, temperature, and substantially any parameter or measurement that has some relationship to energy or power.

The energy objects 130 can also be employed to manage billing for usage including charging for the total kWh over a billing period. This may be tiered in rate, changed by season, changed by time of day (on/off peak), and so forth. Electrical peak demand charges can include automated charging/billing for the highest average kW usage during any single demand interval in the billing cycle. Demand intervals can include subdivision of the billing cycle during which peak demand is measured. Intervals are typically a 15 or 30 minute period but other periods can be employed. Intervals may be "rolling" or fixed to a time reference. Ratchet clauses can be supported that include increased peak demand charges in subsequent billing cycles due to a high peak demand in a prior billing cycle. Reactive demand charges include usage at non-unity power factor. The energy objects can also be employed with a safety component (e.g., safety PLC to control switching to different energy states) that limits activation, deactivation or modulation of an energy consuming or producing resource.

In one example application of the system 100, a manufacturing automation system for monitoring Cap and Trade emissions across multiple devices communicating within an industrial process can be provided. This includes a set of objects having identifiers associated with a number of emitting resources, an emission type, and a monitoring component to facilitate measurement and recording of emissions from the resources within the industrial process. This also includes a controller having an emission cap parameter set within a memory of the controller, where the controller processes the energy object. The system includes an accumulation function operating with the controller and operatively communicating with the object to accumulate the emissions from the resources and calculate a total emission, compare with the cap parameter, and provide notification for a trade if the cap is determined to be increased. The manufacturing automation system can also include a component to increase the cap parameter by communication from the controller to an external source that facilitates the trade.

In another aspect various forecasting applications can be supported. A historian type application can estimate a forward-looking forecast of energy use and demand based on a combination of energy data collected through the energy object, historical production, environmental and other related data, production schedules, weather forecasts, and so forth. The forecast could be set up as one hour, one day, one week, one month ahead (with higher confidence factors the shorter the forecast period), and could be communicated through a "Smart Grid" portal to energy providers to assist them in planning and controlling supply and hopefully passing along resulting efficiencies in the form of lower energy costs.

It is noted that components associated with the system 100 and controllers 120 can include various computer or network components such as servers, clients, controllers, industrial controllers, programmable logic controllers (PLCs), electric drives, energy monitors, batch controllers or servers, distributed control systems (DCS), communications modules, mobile computers, wireless components, control components and so forth that are capable of interacting across a network. Similarly, the term controller or PLC as used herein can include functionality that can be shared across multiple components, systems, or networks. For example, one or more controllers can communicate and cooperate with various network devices across the network. This can include substantially any type of control, communications module, computer, I/O device, sensors, Human Machine Interface (HMI) that communicate via the network that includes control, automation, or public networks. The controller can also communicate to and control various other devices such as Input/Output modules including Analog, Digital, Programmed/Intelligent I/O modules, other programmable controllers, communications modules, sensors, output devices, and the like. It is further noted that the industrial automation as described here in can include substantially any type of manufacturing automation that further includes all process and discrete manufacturing, as well as building maintenance, for example.

The network can include public networks such as the Internet, Intranets, and automation networks such as Control and Information Protocol (CIP) networks including DeviceNet and ControlNet. Other networks include Ethernet, DH/DH+, Remote I/O, Fieldbus, Modbus, Profibus, wireless networks, serial protocols, and so forth. In addition, the network devices can include various possibilities (hardware or software components). These include components such as switches with virtual local area network (VLAN) capability, LANs, WANs, proxies, gateways, routers, firewalls, virtual private network (VPN) devices, servers, clients, computers, configuration tools, monitoring tools, or other devices.

Figure 2:
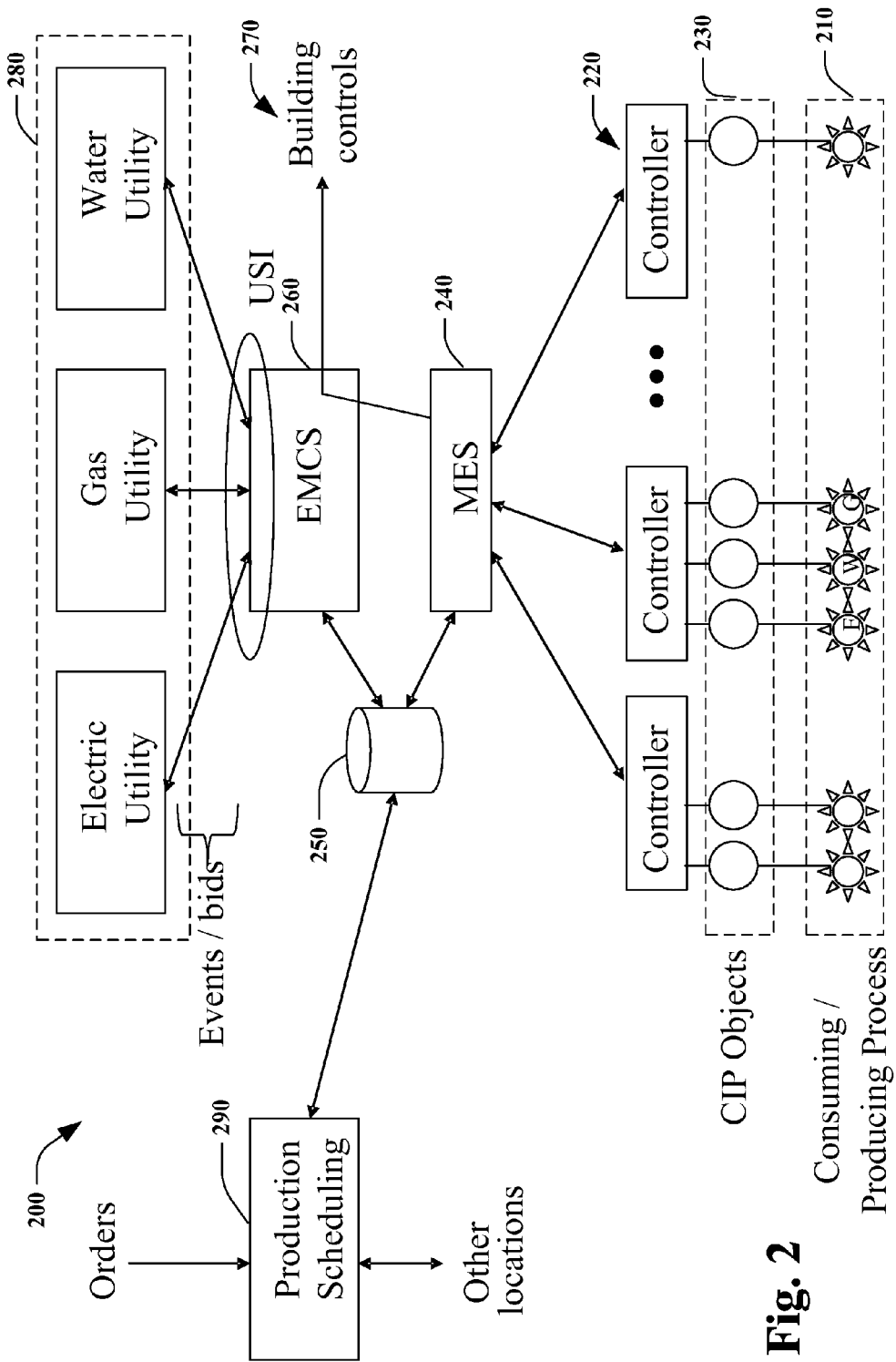
FIG. 2 is a diagram illustrating communications of energy objects to higher level systems.

Turning now to FIG. 2, an example system 200 illustrates communications of information between energy objects and higher level systems. Similar to FIG. 1, the system 200 includes a plurality of consuming or producing energy sources 210 (also referred to as energy resources) that are monitored by various controllers 220, where such controllers 220 can include components or modules that report to supervisory controllers or applications. The controllers 220 embed or route access to one or more energy objects 230 that provide protocol extensions to industrial automation protocols to enhance energy management capabilities of automation devices and software. As shown in this example, the controllers 220 can communicate with a Manufacturing Execution System (MES) 240 that participates in a shared database 250 with an Energy Management Control System (EMCS) 260. The MES 240 provides building controls 270 for energy management of building systems associated with the automation systems under control of the MES 240. The EMCS 260 can communicate with a plurality of utilities at 280 that includes electric, water, and/or gas. The database 250 receives production scheduling requests from Production Scheduling 290, an enterprise resource planning (ERP) system that creates a tentative schedule based on customer orders. The MES 240 system is responsible for the final execution of the schedule to fulfill the orders and has leeway to adjust the schedule in order to manage automation system energy. Such fulfillment may include staggering batch recipe step execution to minimize peak demand.

The energy objects 230 provide power and energy management extensions for devices in the system 200 and for processes controlled by respective devices. This enables manipulating discrete power modes, measuring total energy, and measuring demand (real and reactive), and provide alarm and event messages on energy or power conditions. This also includes optional generation control and optional diagnostic measurements that includes per phase and phase to phase currents and voltages in addition to trending, for example.

FIG. 3 illustrates an example set of parameters that can be employed with an energy object previously described. It is noted that such parameters are not an exhaustive set as other parameters can be provided. At 310, an Identifier tags data to a related automation device or process. At 314, an Aggregation parameter provides paths to aggregated CIP objects that include sub-metering or ability to go to lower energy states (sequential turn-off). A role parameter 320 identifies a source as a producer, consumer, or both. Another parameter includes an Operational State 324 and yet another includes units/scaling factors at 330 to specify accuracy. A Roll Over for Energy parameter is provided at 334 in addition to a production capacity parameter at 340 that includes continuous, stored, and load size (e.g., W,VAR:electricity). At 344, Measurements include Instantaneous, Over a period, Negative values are producing, and so forth. At 350, a Type parameter includes Water, Gas, Air, Steam, and Energy Quality, for example. Energy quality may specify harmonic content, carbon generation rate or other factors related to a choice of energy sources during operation.

At 354, a Time reference parameter includes a time and date of the object (r/w attribute). At 360 a Data log parameter can be provided to store a set of measurements over a time period. At 364 a Priority parameter includes Opt-out, critical, non-critical (Grid categories) and Load shedding (Load-related) to assist in decision making in control of the energy resource. At 370, a Shed and Produce Services set includes a request operation state change estimation, a response indicates time to change operational state, and an actual request to change state. At 374, a CIP A&E (alarms & events) message set includes alarm on energy production below measured level (average or instantaneous) and alarm on energy consumption above a measured level. As can be appreciated more or less parameters, services, or alarm and event messages than shown in FIG. 3 can be provided.

Referring to FIG. 4, an example device model illustrates energy object usage at the device level. A device 400 includes interaction with other systems such as configuration 404, messaging 406, and I/O exchange 408. The device 400 includes non-volatile storage 410 that holds various parameter objects 420. The device 400 also includes various input assembly objects 430 and output assembly objects 440. As shown, the device 400 can include an energy object instance at 450 or associated external object instances at 460. The energy objects 450 and 460 can be integrated providing controller access that is accessible on-demand through messaging that includes placing in tags by logic. The objects are accessible via tags thorough I/O assembly objects 430 and 440. Energy related application logic can also be provided. Human Machine Interface (HMI) access includes OLE for Process Control (OPC) topics reference tags and Energy faceplates. Program access includes substantially any communications software that facilitates energy-specific program enhancements.

Figure 5:
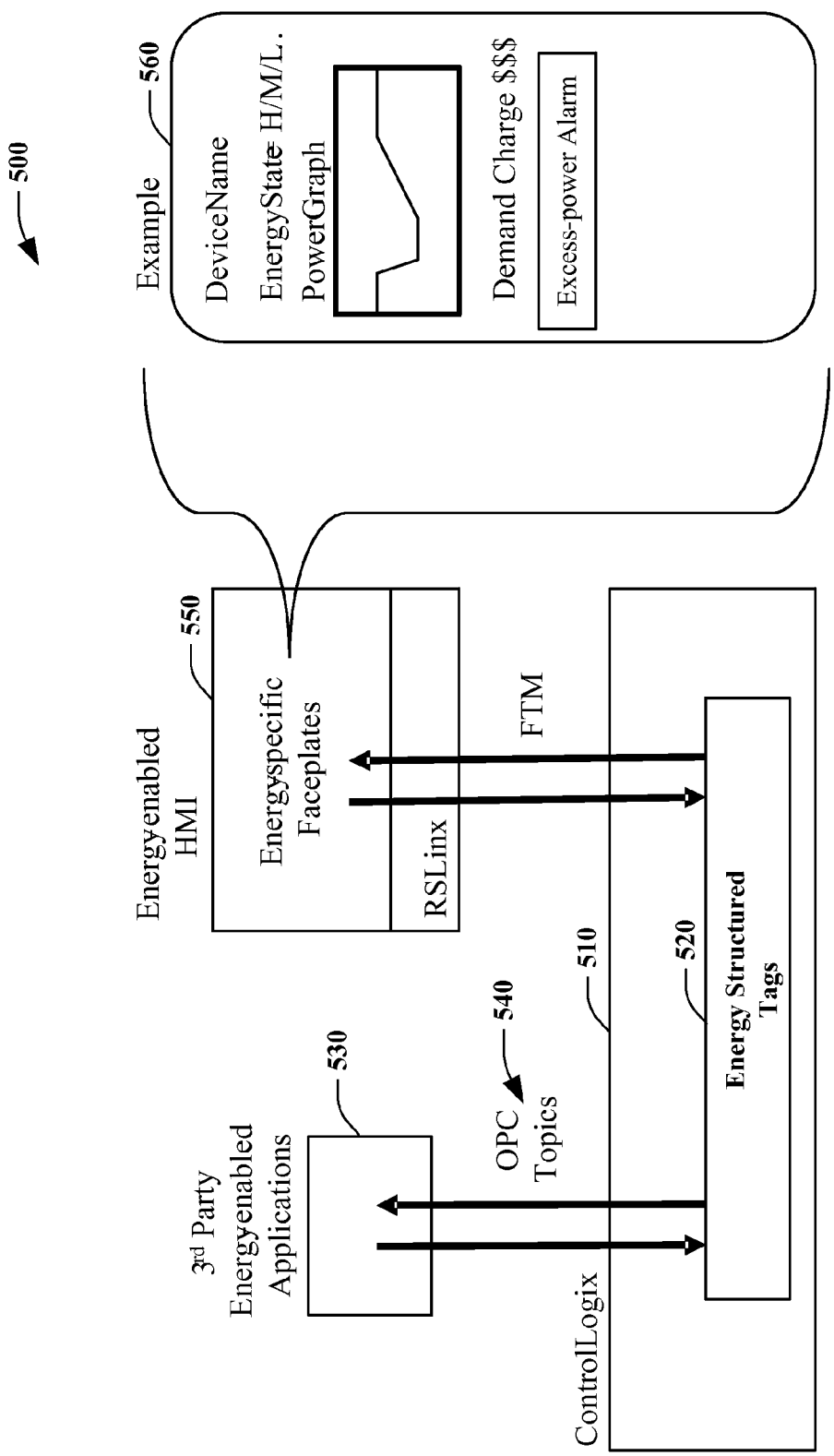
FIG. 5 is a diagram illustrating an example controller information model.

FIG. 5 illustrates an example controller information model 500. The model 500 includes a controller 510 that generates energy structured tags 520 (or tags). The tags 520 can be exchanged with $3^{rd}$ party energy-enabled applications 530 via OPC topics 540 for example. The tags 520 can also be communicated to an energy-enabled HMI 550 that can display various energy example aspects depicted at 560. The examples at 560 that can be generated, communicated to other systems, and/or displayed include an energy resource name, a device name, an energy state, graphs or charts, demand charges, alarms or other event information. As can be appreciated, other factory or control information can be displayed.

Figure 6:
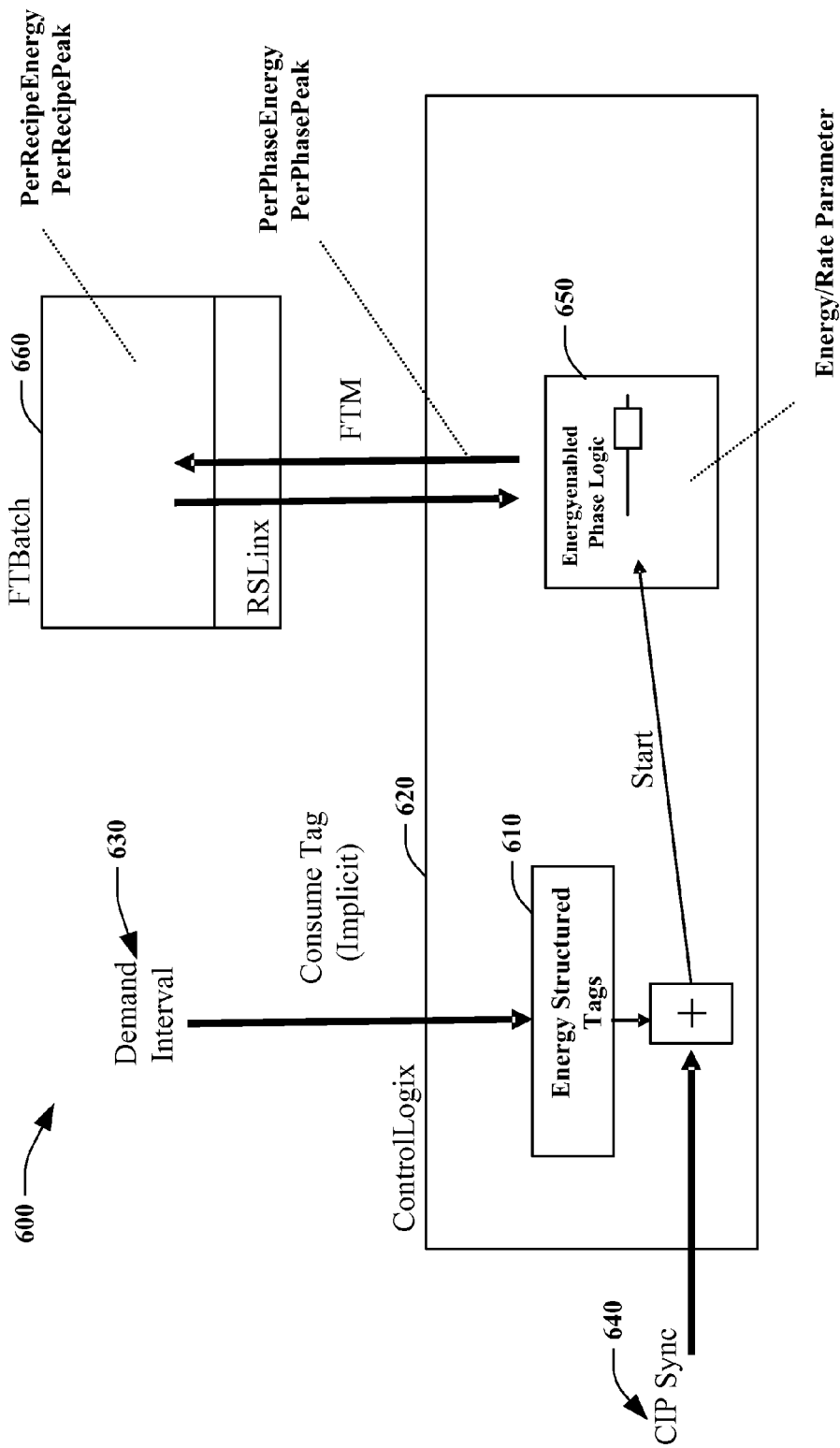
FIG. 6 is a diagram illustrating an example batch energy model.

Referring to FIG. 6, an example batch energy model 600 is illustrated. The model 600 includes energy structured tags 610 that are processed by a controller 620. Such tags 610 can be updated via a predetermined demand interval 630. The tags 610 can be employed with a sync signal 640 to enable energy-enabled phase logic 650 that is controlled by a supervisory batch controller 660, where per recipe energy data or per phase energy data is exchanged. For batch and discrete control applications, equipment can be idled or shut down during non-production times. In addition, the rate of production may be varied to reduce energy consumption.

Figure 7:
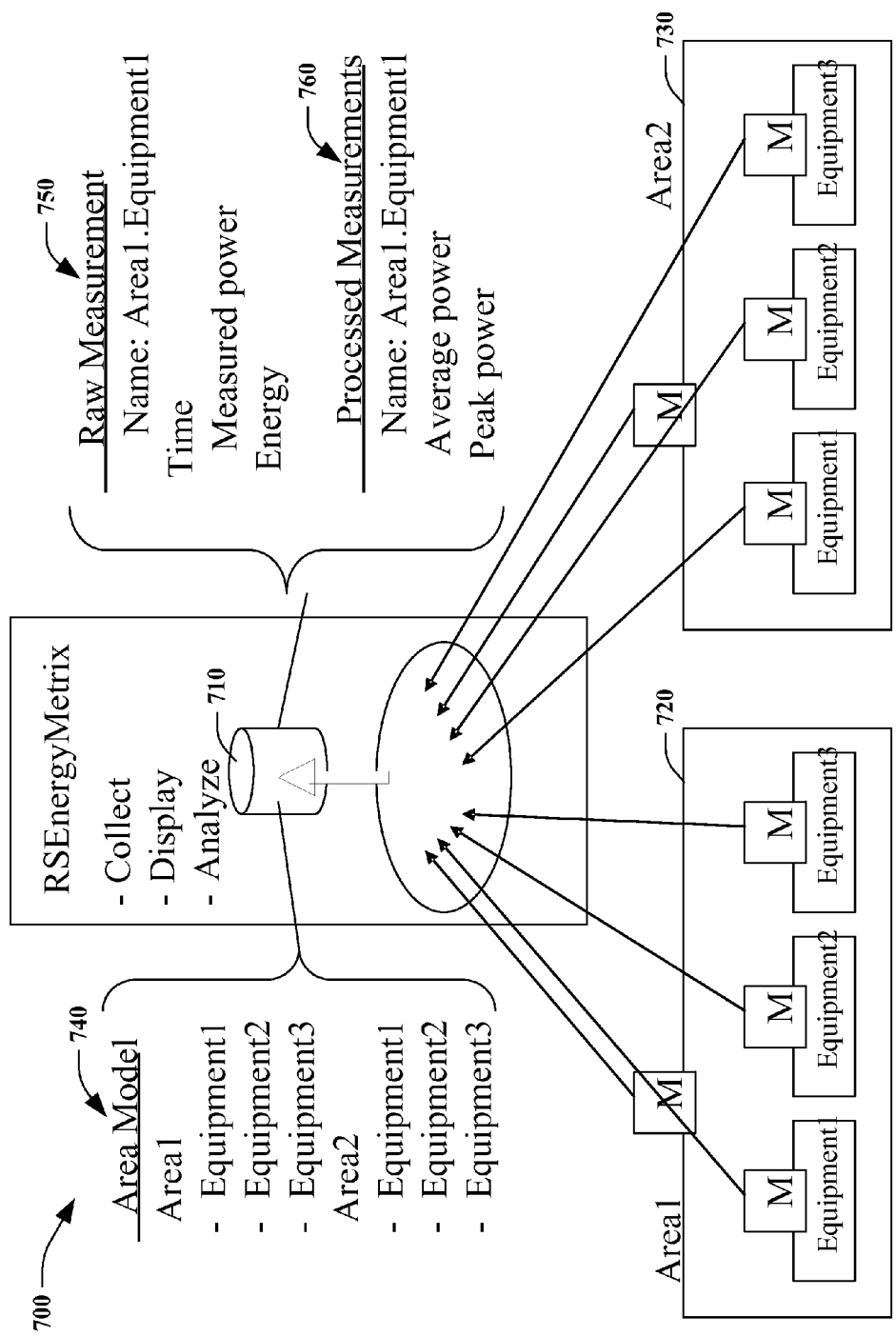
FIG. 7 illustrates an example system for measuring and aggregating energy data.

FIG. 7 illustrates example system 700 for measuring and aggregating energy data. The system 700 includes an energy database 710 (or databases) and associated software for collecting, displaying, and analyzing energy object data. This can include collecting energy object data from one or more factory automation areas shown at 720 and 730. The collected energy data can be represented in the database 710 as an area model shown at 740 which represents the equipment or devices that consume or produce energy at discrete locations in a production process. The data can include raw measurements at 750 or processed measurements at 760. Raw measurement data 750 can include an area name, equipment name, time, measured power, or energy. Processed measurements can include in addition to area name and equipment name, average power and peak power for example. As can be appreciated, a plurality of other computations and energy data can be processed or stored.

Figure 8:
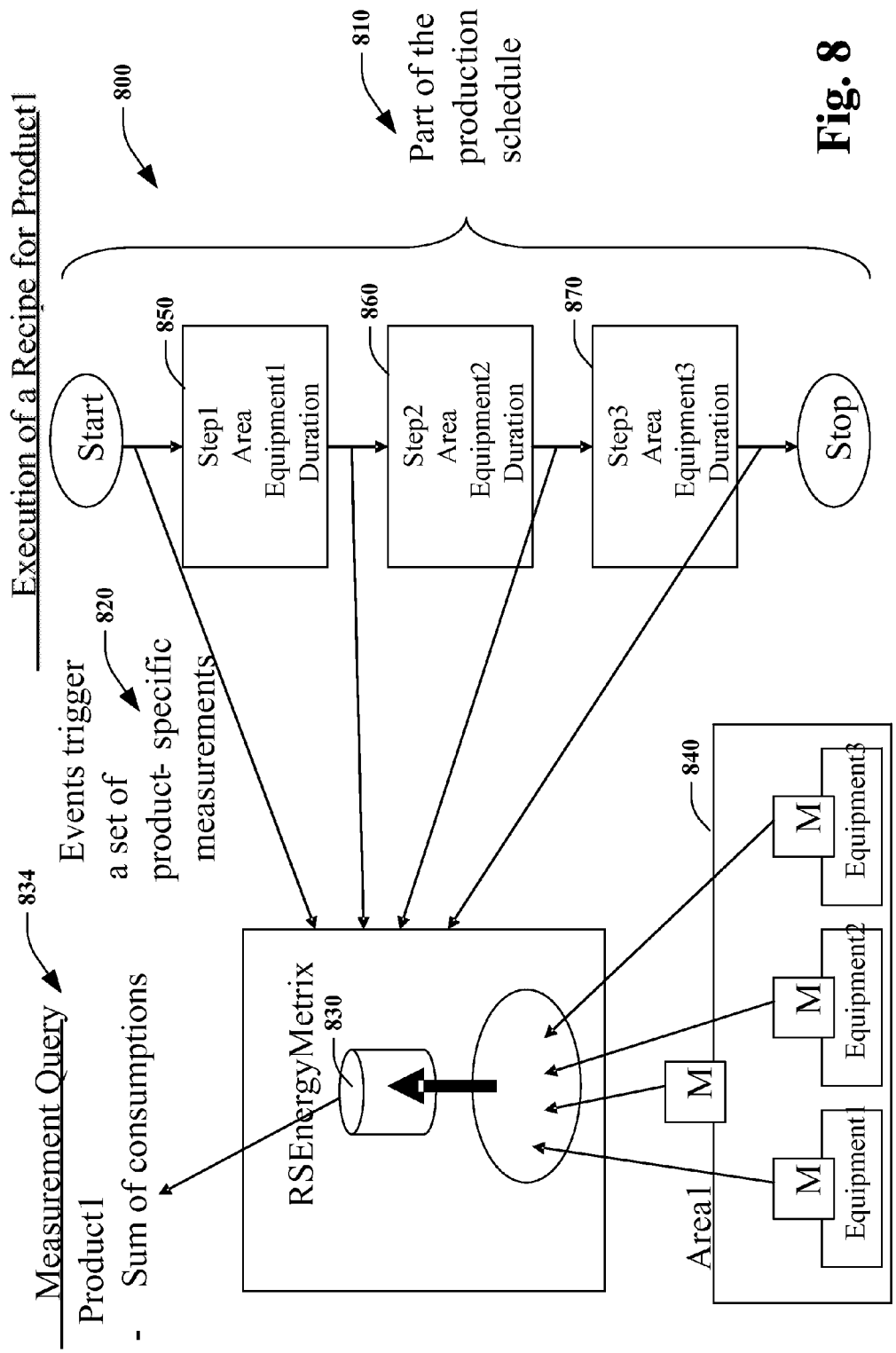
FIG. 8 illustrates an example system for measuring energy during execution of an automated process.

FIG. 8 illustrates an example system 800 for measuring energy during execution of an automated process. In this aspect, a production process 810 triggers events 820 that cause energy data to be measured and collected at 830 for each step in a production sequence. For instance, these events may enable a further measurement query and summing of energy data at 834, where the query returns the total energy required to produce a specific product or production batch. As shown, the energy is measured from an area 840 but as noted previously, multiple areas can be measured within a factory or aggregated from across factories that communicate via a network. At each stage shown at 850-870 of the process 810 (or selected stages), events are generated at 820 to trigger collection of data at 830. As can be appreciated, discrete processes (non-batch or recipe) can similarly trigger energy data collection. In this aspect, production consumes energy at least partially in relation to the specific products. This enables per-phase energy measurements where phases are added for per product energy consumption. This provides the basis for demand interval synchronization and demand measurement for product and batch phases or discrete assembly processes.

Figure 9:
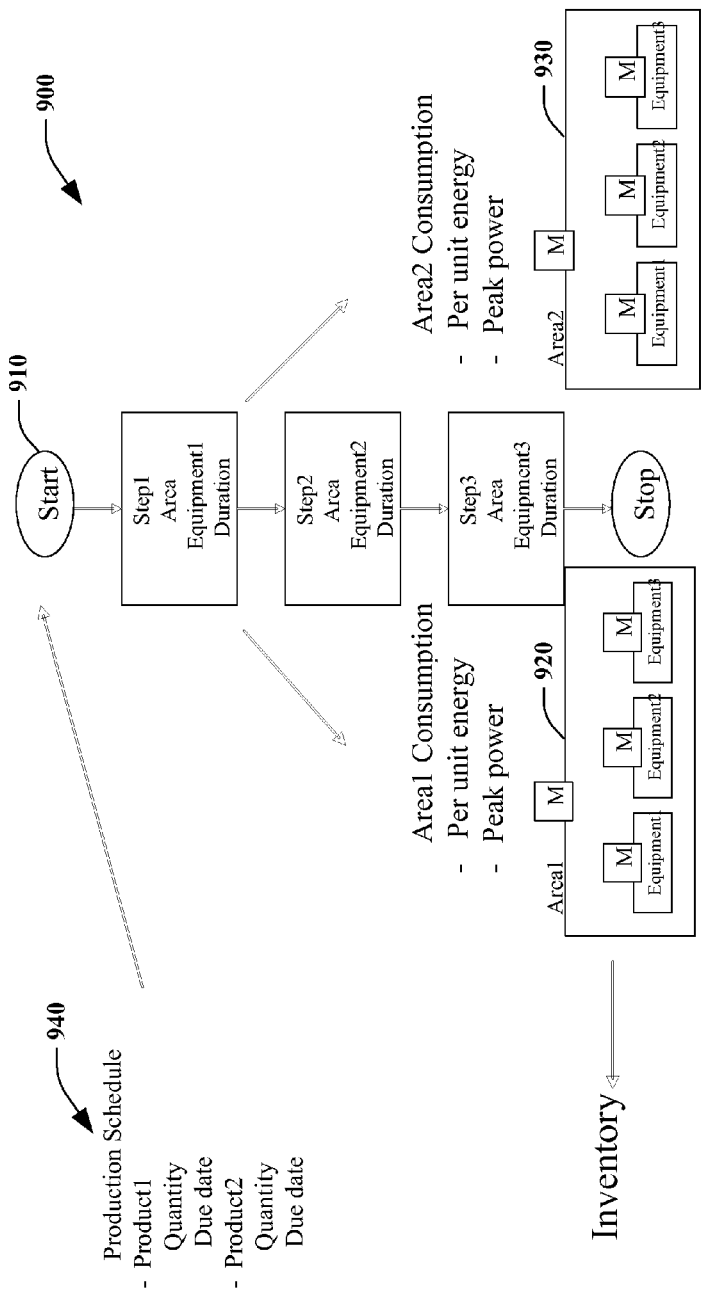
FIG. 9 illustrates an example system depicting scheduling production over multiple areas according to energy consumption.

FIG. 9 illustrates another example system 900 depicting scheduling production over multiple areas according to energy consumption. A process 910 starts area equipment that is enabled or disabled across an area at 920 and/or an area at 930. In this example, the area 920 may be in a more automated area, provide lower lead time, have higher peak power, utilize more per unit energy and so forth. The area 930 may be in a less automated area, provide higher lead time, have lower peak power, utilize less per unit energy and so forth. By monitoring the energy objects from the respective areas 920 and 930, energy can be shifted between areas to more efficiently utilize plant resources. As shown, an automated production schedule 940 can initiate the process 910. For example, production can be scheduled to meet combined constraints of delivery before a deadline and reducing peak power in a future period. This could include building to inventory prior to deadline and future reduced power period or delivering from inventory, building at a slower rate in alternate with lower peak power, and/or rearranging parallel production so that power peaks are not concurrent.

Figure 10:
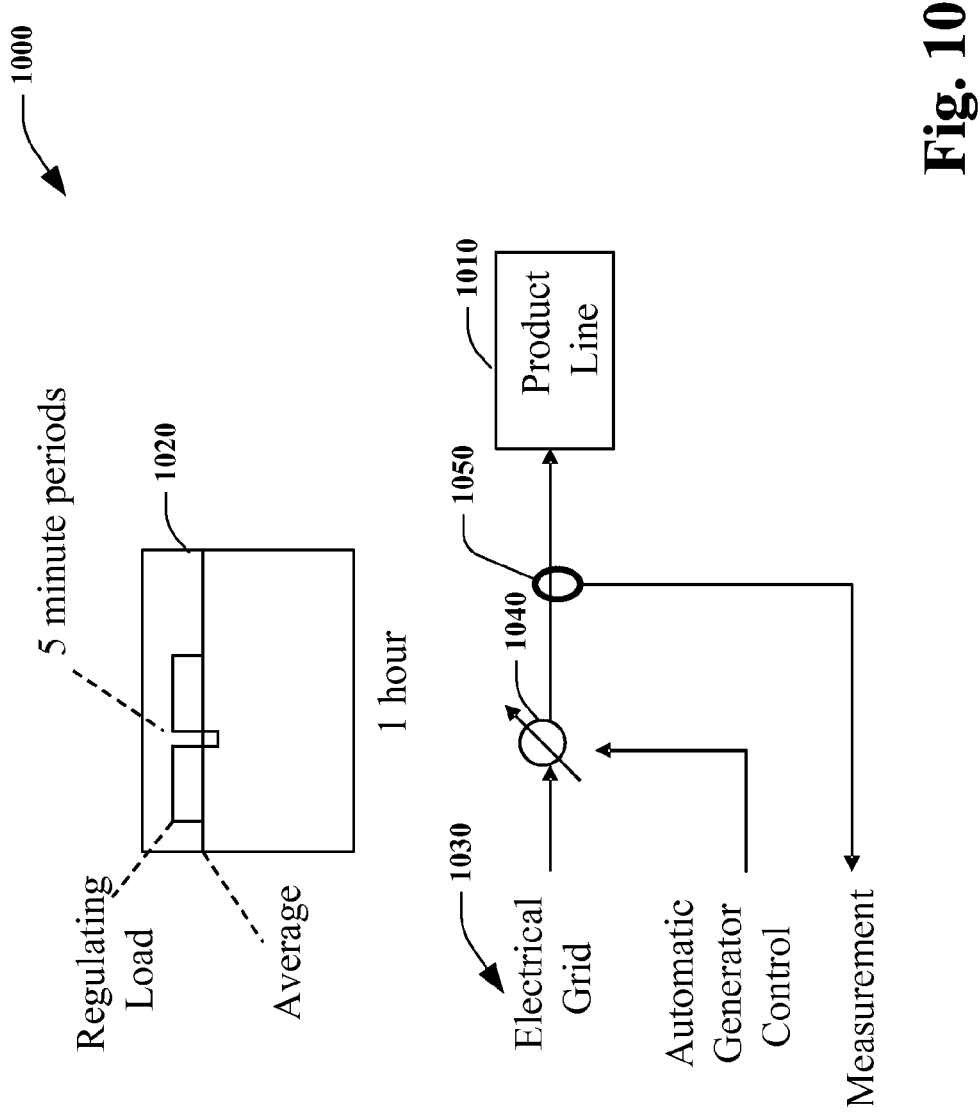
FIG. 10 illustrates an example application for energy management of a product line.

FIG. 10 illustrates an example application system 1000 for energy management of product line 1010 (e.g., aluminum or steel production). In this aspect, the product line 1010 is regulated for average power according to five minute periods at 1020. An electrical grid 1030 feeds the line 1010 and is controlled by an automatic generator control 1040 (AGC). Measurement devices are stationed on the power lines (e.g., inductive or direct) at 1050, where data from the measurements are employed in accordance with an energy object (not shown, described above). In this application, the system 1000 is enabled via the objects to join energy markets as a regulation source and thus provide a grid service. Regulation thus can provide a service where load current is based on AGC signals from the grid and a process automatically modulates load over a range while mitigating emissions, product degradation, and/or equipment damage.

It is noted that power quality load (phase) balancing applications can utilize an energy object in communicating power quality information and sending out alerts of fault conditions so that an energy consumer (e.g., drives and rectifiers) can change their operating point to control power factor, or phase imbalance at the point of common coupling. For instance, a non-electrical example, in an air system, a second compressor could be signaled to turn on in the event of a leak, or primary compressor failure. Thus, metering devices can be employed that can collect and trigger events. The events can be used by the energy object to change the operating point of the device (e.g., drive) in other ways than to reduce energy consumption (power factor, phase imbalance). This communication can be direct from device to device to facilitate fastest action. In some applications, communication is performed from the device monitoring energy, reporting to a controller. In other applications however, messages can be sent from device to device (rather than through a controller) when it is advantageous to do so. It is also noted that when consumable resources are measured, they can be included in the scope of the CIP energy object to provide enhanced forecasting. For example, measuring the solar intensity water temperature, fuel oil levels or wind speed in addition to the electrical power can be helpful in forecasting energy usage.

Figure 11:
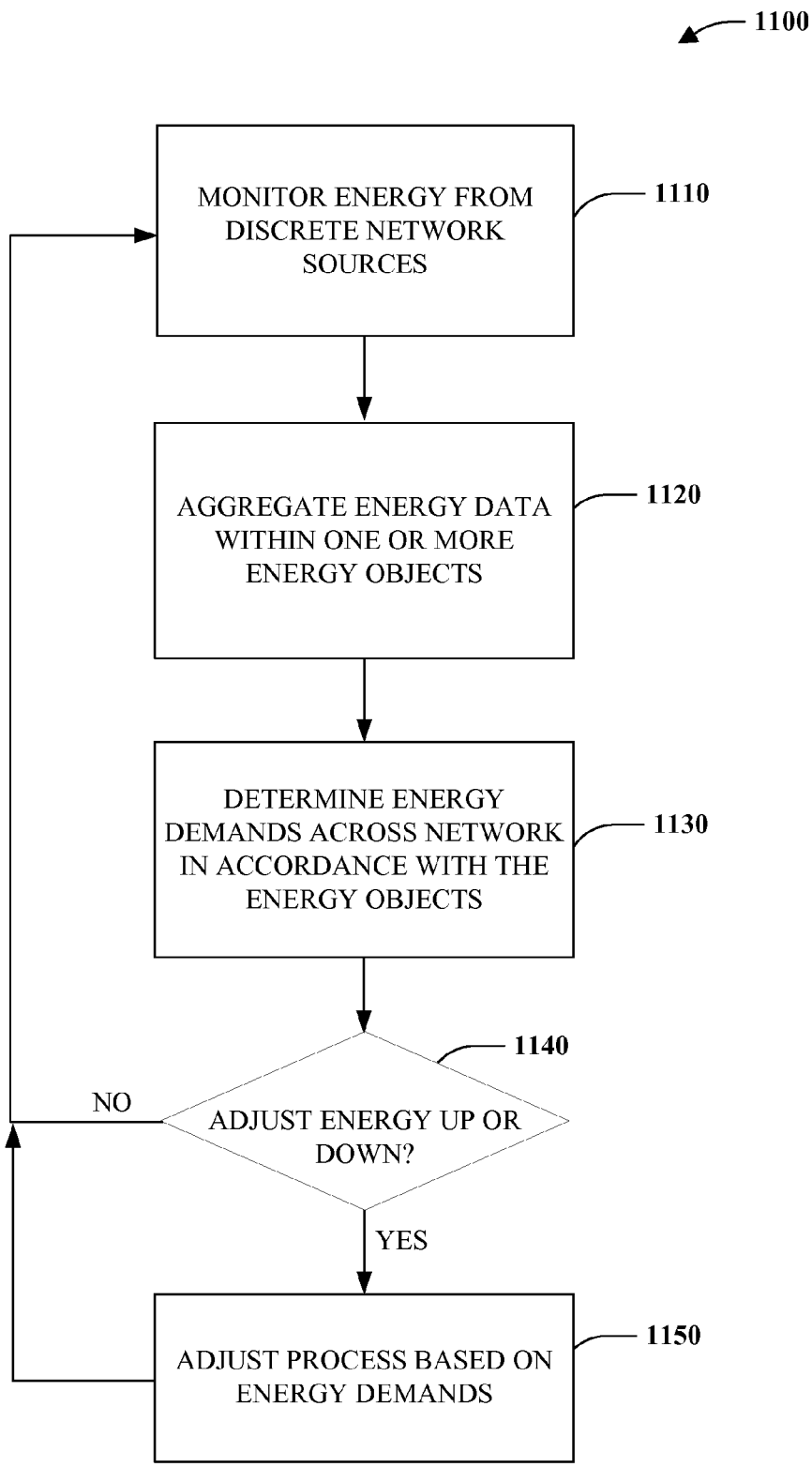
FIG. 11 is a flow diagram illustrating an example energy management process.

FIG. 11 is a flow diagram illustrating an example process 1100 for automated energy management. While, for purposes of simplicity of explanation, the methodology is shown and described as a series of acts, it is to be understood and appreciated that the methodologies are not limited by the order of acts, as some acts may occur in different orders or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology as described herein.

Proceeding to 1110, one or more discrete energy sources are monitored across a network. These can include conventional sources such as gas or electric or include more nuanced sources such as are described in more detail below with respect to sustainability factors. At 1120, energy data is aggregated and subsequently communicated via one or more energy objects as were previously described. Such objects can be employed to extend substantially any industrial protocol with energy monitoring and control capability. At 1130, energy demands are determined from across the network (or networks) from where the discrete energy sources were collected. This can include determining whether systems or process should be activated or deactivated to conserve and manage energy resources. As noted previously, a safety controller can be employed to facilitate such activation and/or deactivation where some components on the network may be activated while others are concurrently deactivated. At 1140, a determination is made as to whether or not energy should be automatically adjusted up or down. This can include idling or reducing energy in some processes and while activating or increasing energy in some others. If such adjustment is warranted, the process automatically adjusts energy supply or demand at 1160 before proceeding back to 1110 and monitoring energy. If no such adjustment is required, the process proceeds back to 1110 from the decision at 1140.

In general, energy packets or objects can be utilized for various applications. These include methods for aggregating energy data, measuring each machine for analysis and comparison, and determining energy cost per product (e.g., by tagging a bill of material with object data). The objects enable bridging the gap between 1st and 2nd shifts for example and minimize energy costs. These include providing energy information for use with other factors, such as order backlog, labor costs, and so forth. Line of sight controls include Level 1—basic metering, Level 2—sub metering, and Level 3—integrated data/decision forecasting.

The energy objects facilitate a proactive system that considers raw materials, physical assets/equipment, and production schedule for the user including use by automated agents. The energy object can be combined with CIP protocol for real-time monitoring and control. This includes determining regeneration opportunities within industrial drive and motion controllers. For example this includes control algorithms for mechanical shift to allow powered drives/controllers to affect idle drives/controllers.

The energy object includes a framework and proxy for certain applications including synchronized use of CIP objects across multiple facilities to effectuate produce/consume energy decisions. This helps users identify opportunities to harness energy existing in the facility which can include the use of gravity, motion on rollers, or transfer to flywheel or alternative fuel source (e.g., hybrid energy). The CIP energy objects can be employed to intelligently communicate with active and idled equipment to save costs. For example considering where robots are idle so many hours per year or what conveyors and other applications are employed including "Just-in-time" power concepts. The object can be employed as an entry point into the application and employed with suppliers to compare products and improve products/equipment used in facility. As noted previously CIP energy objects can place devices into "safe" mode/state based on safety modes.

The CIP energy objects can also be used in facility optimization where attributes of CIP energy objects include maximum and minimum values for each device. Some example attributes include an identifier, a device name, a hierarchy/fully qualified parameter, an object class, a role, a type of energy including water, gas, air steams, a measurement parameter, some type of aggregation, and some type of time reference. The energy objects can reside in various industrial automation hardware or software configurations.

It is noted that the term energy as used herein can be broadly defined to include one or more sustainability factors that can also be employed with the energy objects described herein. Sustainability factors can be associated with the product, the process, or a combination. The Sustainability factors can be used to extend a) the specification of materials and products b) the work instructions used to transform the products into finished material c) descriptors and other factors associated with the human resources performing production d) factors associated with the machines performing production e) factors associated with the facility and utilities supply chain involved in production, such as type of electricity used (solar vs. wind vs. coal, for example) and f) scheduling information. Sustainability factors can be created using known industry standards, or, individuals can develop their own factors in order to track and measure those characteristics that are of particular importance to them. However, as a sustainability factor could be self-created to account for factors unique in importance to an individual, company, retailer, region, and so forth, thus, it is to be appreciated that is not an all-inclusive list. Thus, energy objects as described herein can include monitoring and/or control of one or more sustainability factors. The following description provides some example processes where energy objects can be employed to monitor or control sustainability factors.

In one aspect, energy objects can be employed for optimizing production in view of detected carbon footprint ranges. In this aspect, sustainability factors are monitored and a decision is made as to whether or not current production methods are within an acceptable range to meet the desired carbon footprint. If the current range is acceptable, the process employs current production methods that satisfy the respective ranges. If the current production is not within acceptable ranges, the process proceeds where ingredients may be altered, shipping methods may be altered, and/or manufacturing methods may be altered to achieve desired carbon footprint levels. As noted previously, factors outside of the production process itself can impact the ultimate cost and profitability of the end product. Production using resources from various regions, or targeted for shipment to various regions, can be automatically modified depending upon the acceptable range of detected values for the carbon footprint of the end product which can be communicated and controlled via the energy objects. Thus, modeling can determine: which batch of raw ingredients or; which manufacturing method and/or; which shipping method provides the lowest (or suitable) overall carbon footprint for a particular product and/or destination.

In another aspect, energy objects can be employed for optimizing procurement and shipping systems in view of detected environmental or other energy/sustainability factors. Environmental factors are considered such as weather or other climate goals that may be desired for a particular product or process. Thus, it may be determined that a particular location is cooler than projected thus a different type of shipping or packaging could be employed. Procurement of supplies and/or production methods can be automatically adjusted in view of current environmental data. Material or products can be purchased or transported to support the environmental goals. As noted previously, shipments and additional factors could be aligned with environmental factors such as weather, to minimize environmental impact. For example, by coordinating with weather systems, truck shipments in affected regions could be delayed during 'ozone alert' times, or shifted to rail transport. The overall objective could be to optimize production while minimizing environmental impact. Advanced modeling could ascertain that under certain conditions, high ozone days are likely to occur in an upcoming week, and thus the manufacturer should pre-order those materials that require truck shipments to avoid increasing the ozone impact. Similarly, by coordinating with weather systems, production and shipping could be optimized to take advantage of 'hotter' or 'colder' routes for products requiring controlled storage, for example. The energy objects described herein can be employed to provide such coordination and control.

In yet another aspect, energy objects can be employed for optimizing regulatory compliance in view of various sustainability factors. Regulatory rules can be determined for a destination location, for example. These can include safety compliance, emissions, carbon taxes, in addition to other sustainability factors. Production requirements can be determined in view of the rules and related sustainability factors and optimized in view of the regulations. This can include manufacturing with alternative energy sources in order to meet some incentive offered by a regulating body. Labels can be automatically updated to reflect compliance with regulations and sustainability factors. Data and processes from a sustainability optimization system could include interconnectivity with a database containing regulatory rules to simplify regulatory decision making and oversight. For example, a particular government authority may desire to encourage the use of solar power. Merely having energy usage information on a label would be insufficient to administer a tax on a product, as that would not indicate what type of energy was used. By associating a sustainability factor indicating the type of energy used for production, in addition to other relevant sustainability factors, manufacturers could optimize production to take maximum advantage of government rebates and other incentives while minimizing the risk of adverse judgments. Similarly, regulatory bodies could optimize tax administration and administration of other regulations to drive the desired behavior to keep their economies and environments responsible and sustainable.

As noted previously, discrete energy monitors can be stationed throughout an industrial system or process and are employed to collect data from various sustainable sources including produced or consumed energy. The sustainable sources can be from various portions of a process and related to such factors as energy or waste for example. A tagging component such as a data historian (e.g., I/O module that identifies where/when energy is consumed) is provided to label or mark the collected source data as to which portion of an industrial process the data is associated with. For example, in a batch process, the source data may be tagged to indicate which pipe or valve a recipe component was transported across and how much energy such pipe or valve consumed as part of the process. From another point of view, the pipe or valve may be attributed to the amount of waste associated with a portion of the batch process and in its own manner, reflect a type of energy or sustainability factor that is attributable to the respective process. In a discrete process, where items may be assembled in a parallel or serial manner, the sources may be tagged to indicate a sustainability factor for the various components of the discrete process (e.g., discrete process A building an engine lists various components of the engine where the tagged data from the sources is associated with the engine components). A processor or controller collects the tagged data and links the tagged data with a manufacturing model to produce a model or specification that includes the discrete or batch process components that have been associated with the respective sustainability factors or energy source data. By associating energy or other sustainability factors with the manufacturing model or specification, various efficiencies can be provided for and managed within the factory since each item's energy/sustainability component can now be accounted for and traced as a component of the respective discrete or batch process.

In general, sustainable factors such as energy are monitored throughout a plant or process and associated with the model and energy object in order to increase plant efficiencies. Automated monitors can receive data from a plurality of sustainable sources that are distributed across an industrial process. Such processes can include discrete processes where automated assemblies occur (e.g., packaged assemblies) or can include batch processes where mixtures of various ingredients are combined to form a recipe or other combination of elements (e.g., chemical process, food process, beverage process, and so forth). As the respective processes are monitored, sustainable sources such as energy that is collected is tagged to indicate which portion of the discrete or batch process that the source contributed to. After tagging, the data is associated with the manufacturing model, where industrial managers or automated processes can then analyze the process for the components of energy that were attributed to the various portions of the respective process.

In contrast to prior systems that could only view energy from the overall sense of plant-wide consumptions, the source data that is associated with the energy object can now be analyzed in real-time or via offline modeling to optimize and mitigate energy usage. For example, portions of a process may be rearranged to minimize overall energy usage (e.g., perform step C before step A in order to conserve energy from the reverse order of A and C). It is noted that various models can have associated sustainable factors. Such models include MRP models (material requirement planning), MES models (manufacturing execution system), ERP models (enterprise resource planning), programming models (e.g., ladder logic, SFC, batch program, function block), and so forth. In general, the energy objects aggregates energy or other consumption data from the plant floor and correlates it to production output. This enables applying standard production modeling tools for production energy and emission forecasting and optimization, while extending the existing facility demand management system to include production, and lastly, link that system to the Demand Response and Smart Grid (DRSG), as well as, Cap and Trade systems, for example.

In another aspect, an energy object extension to an industrial protocol having a comprehensive suite of attributes, messages and services utilized for the monitoring and control of energy consuming or producing resources by a manufacturing automation application is provided. The energy object includes an identifier associated with an energy resource that is associated with a manufacturing automation application and an energy type associated with the energy resource. This includes a measurement characteristic associated with the energy resource to facilitate energy management by the manufacturing automation application. The industrial protocol is associated with a Common Industrial Protocol (CIP) that further comprises an Ethernet protocol, a device protocol, a control protocol, or a Modbus protocol, for example. The energy object extension includes a demand and response application to activate or deactivate components to facilitate energy management. This can also include a safety component to activate or deactivate components. The demand and response application is associated with reducing a base load, sequencing a start up, shedding non-critical loads, generating power, storing energy for later use, staggering power peaks, or operating at a reduced rate or capacity and can also be associated with a smart grid. This includes a manufacturing execution system (MES) or an energy management control system (EMCS) to facilitate energy management.

In another aspect, a historian component is employed to generate the identifier, energy type, or measurement characteristic. The energy object extension includes an aggregation parameter, a role parameter, or an operational state parameter. This includes a units/scaling parameter, a roll over parameter, production capacity parameter, or a type parameter. This also includes a time parameter, a data log parameter, a shed and produce service, or an alarm and event message. The energy object extension also includes a parameter object to facilitate configuration, an energy object instance for a device, or an input/output assembly object to facilitate control. This includes an energy structured tag to facilitate energy control and an energy-enabled application that includes a device name, an energy state, a power graph, a demand charge, or an alarm. This can also include energy-enabled phase logic to facilitate energy control in a process or a controller to set increased energy modes of a system. The energy object extension includes a regulation service that exchanges energy to facilitate performance of other components associated with a grid. This includes one or more sustainability sources that are employed to control energy resources, where the sustainability sources are associated with cap and trade policies, waste management activities, or maintenance activities.

In another aspect, a manufacturing automation system for monitoring energy across multiple devices connected by one or more networks is provided. This includes a control and information platform for automatically increasing or decreasing energy resources of an automated system; and an energy object having an identifier, an energy type, and a measurement component to facilitate increasing or decreasing energy resources of the automation system.

In another aspect, a method to extend an industrial protocol having a comprehensive suite of attributes, messages and services for manufacturing automation applications related to energy production and consumption is provided. This includes monitoring a plurality of energy sources; associating the energy sources with a plurality of energy objects; associating the energy sources with an industrial automation protocol; and employing the industrial automation protocol to dynamically increase or decrease energy demands across an automated factory environment. The energy object includes an identifier, a measurement characteristic, an aggregation parameter, a role parameter, an operational state parameter, a units/scaling parameter, a roll over parameter, production capacity parameter, or a type parameter, a time parameter, a data log parameter, a shed and produce service, or an alarm and event message.

It is noted that as used in this application, terms such as "component," "module," "system," and the like are intended to refer to a computer-related, electro-mechanical entity or both, either hardware, a combination of hardware and software, software, or software in execution as applied to an automation system for industrial control. For example, a component may be, but is not limited to being, a process running on a processor, a processor, an object, an executable, a thread of execution, a program and a computer. By way of illustration, both an application running on a server and the server can be components. One or more components may reside within a process or thread of execution and a component may be localized on one computer or distributed between two or more computers, industrial controllers, or modules communicating therewith.

The subject matter as described above includes various exemplary aspects. However, it should be appreciated that it is not possible to describe every conceivable component or methodology for purposes of describing these aspects. One of ordinary skill in the art may recognize that further combinations or permutations may be possible. Various methodologies or architectures may be employed to implement the subject invention, modifications, variations, or equivalents thereof. Accordingly, all such implementations of the aspects described herein are intended to embrace the scope and spirit of subject claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An industrial automation hardware device, comprising:
a memory storage medium storing an energy object extension to an industrial protocol having a comprehensive suite of attributes, messages and services utilized for monitoring or control of an energy consuming or producing resource by a manufacturing automation application, wherein the energy object extension comprises:
an identifier associated with an energy resource that is associated with a manufacturing automation application, wherein the manufacturing automation application is employed to activate, deactivate or modulate energy consuming or producing resources to facilitate energy management, and wherein the manufacturing automation application is associated with reducing a base load, sequencing a start up, shedding non-critical loads, generating power, storing energy for later use, staggering power peaks, or operating at a reduced rate or capacity;
an energy type associated with the energy resource; and
a measurement characteristic associated with the energy resource to facilitate energy management by the manufacturing automation application.

2. The industrial automation hardware device of claim 1, wherein the industrial protocol is an extension of a Common Industrial Protocol (CIP).

3. The industrial automation hardware device of claim 1, wherein the energy object extension comprises a safety component that limits activation, deactivation or modulation of an energy consuming or producing resource.

4. The industrial automation hardware device of claim 1, wherein the manufacturing automation application is associated with a smart grid.

5. The industrial automation hardware device of claim 1, wherein the manufacturing automation application comprises a manufacturing execution system (MES) or an energy management control system (EMCS) to facilitate energy management.

6. The industrial automation hardware device of claim 1, wherein the manufacturing automation application comprises a historian component to generate the identifier, energy type, or measurement characteristic.

7. The industrial automation hardware device of claim 1, wherein the energy object extension comprises an aggregation parameter, a role parameter, or an operational state parameter.

8. The industrial automation hardware device of claim 1, wherein the energy object extension comprises a units/scaling parameter, a roll over parameter, a production capacity parameter, or a type parameter.

9. The industrial automation hardware device of claim 1, wherein the energy object extension comprises a time parameter, a data log parameter, a shed and produce service, or an alarm and event message.

10. The industrial automation hardware device of claim 1, further comprising a parameter object to facilitate configuration of an energy object instance, or an input/output assembly object to facilitate control.

11. The industrial automation hardware device of claim 1, further comprising an energy structured tag linked to the energy object extension through messaging to facilitate energy control.

12. The industrial automation hardware device of claim 1, further comprising an energy-enabled application that includes an energy resource identifier, a device name, an energy state, a power graph, a demand charge, or an alarm.

13. The industrial automation hardware device of claim 1, further comprising energy-enabled phase logic to facilitate energy control in a batch process.

14. The industrial automation hardware device of claim 1, further comprising a controller to adjust the energy consumption or production levels of a set of energy resources.

15. The industrial automation hardware device of claim 1, further comprising a regulation service that modulates an energy consuming or producing resource to facilitate performance of other components associated with a grid.

16. The industrial automation hardware device of claim 1, further comprising one or more sustainability rules that are employed to control energy resources.

17. The industrial automation hardware device of claim 1, wherein the sustainability rules are associated with cap and trade policies, waste management activities, or maintenance activities.

18. A method to extend an industrial protocol, comprising:
associating a comprehensive suite of attributes, messages and services for manufacturing automation applications related to energy production and consumption to the industrial protocol, wherein associating the comprehensive suite of attributes comprises:
monitoring a plurality of energy resources;
associating the plurality of energy resources with a plurality of energy objects having energy object extensions to an industrial automation protocol;
associating the plurality of energy resources with the industrial automation protocol; and
employing the industrial automation protocol to dynamically increase or decrease energy demands across an automated factory environment.

19. The method of claim 18, wherein the energy object comprises an identifier, a measurement characteristic, an aggregation parameter, a role parameter, an operational state parameter, a units/scaling parameter, a roll over parameter, a production capacity parameter, a type parameter, a time parameter, a data log parameter, a shed and produce service, or an alarm and event message.

20. A manufacturing automation system for monitoring Cap and Trade emissions across multiple devices communicating within an industrial process, comprising:
a controller having an emission cap parameter set within a memory of the controller, wherein the controller is associated with an energy resource, and wherein the controller is configured to:
instantiate at least one energy object associated with the energy resource, wherein the at least one energy object comprises and having an identifier associated with the energy resource, an emission type, and a monitoring component to facilitate measurement recording of emissions from the energy resource within the industrial process; and
communicate with the at least one energy object to accumulate the emissions from the energy resource and calculate a total emission, compare with the emission cap parameter, and provide notification for a trade if the cap is determined to be increased.

21. The manufacturing automation system of claim 20, wherein the controller is configured to increase the emission cap parameter by communication to an external source that facilitates the trade.

22. The industrial automation device of claim 1, wherein the manufacturing automation application is associated with reducing a base load.

23. The industrial automation hardware device of claim 1, wherein the manufacturing automation application is associated with sequencing a start up.

24. The industrial automation hardware device of claim 1, wherein the manufacturing automation application is associated with shedding non-critical loads.

25. The industrial automation hardware device of claim 1, wherein the manufacturing automation application is associated with generating power.

26. The industrial automation hardware device of claim 1, wherein the manufacturing automation application is associated with storing energy for later use.

27. The industrial automation hardware device of claim 1, wherein the manufacturing automation application is associated with staggering power peaks.

28. The industrial automation hardware device of claim 1, wherein the manufacturing automation application is associated with operating at a reduced rate or capacity.

29. The method of claim 18, comprising employing the industrial automation protocol to reduce a base load.

30. The method of claim 18, comprising employing the industrial automation protocol to sequence a start up.

31. The method of claim 18, comprising employing the industrial automation protocol to shed non-critical loads.

32. The method of claim 18, comprising employing the industrial automation protocol to generate power.

33. The method of claim 18, comprising employing the industrial automation protocol to store energy for later use.

34. The method of claim 18, comprising employing the industrial automation protocol to stagger power peaks.

35. The method of claim 18, comprising employing the industrial automation protocol to operate at a reduced rate or capacity.

36. The method of claim 18, comprising employing one or more sustainability rules to dynamically increase or decrease the energy demands across the automated factory environment.

37. The method of claim 36, wherein the sustainability rules are associated with cap and trade policies.

38. The method of claim 36, wherein the sustainability rules are associated with waste management activities.

39. The method of claim 36, wherein the sustainability rules are associated with maintenance activities.

40. The method of claim 19, wherein the energy object comprises an identifier.

41. The method of claim 19, wherein the energy object comprises a measurement characteristic.

42. The method of claim 19, wherein the energy object comprises an aggregation parameter.

43. The method of claim 19, wherein the energy object comprises a role parameter.

44. The method of claim 19, wherein the energy object comprises an operational state parameter.

45. The method of claim 19, wherein the energy object comprises a units/scaling parameter.

46. The method of claim 19, wherein the energy object comprises a roll over parameter.

47. The method of claim 19, wherein the energy object comprises a production capacity parameter.

48. The method of claim 19, wherein the energy object comprises a type parameter.

49. The method of claim 19, wherein the energy object comprises a time parameter.

50. The method of claim 19, wherein the energy object comprises a data log parameter.

51. The method of claim 19, wherein the energy object comprises a shed and produce service.

52. The method of claim 19, wherein the energy object comprises an alarm and event message.

* * * * *